United States Patent Office 3,411,891
Patented Nov. 19, 1968

3,411,891
SALTS OF NONAHYDRONONABORATES AND THEIR PREPARATION
Frank K. Klanberg, Wilmington, Del., assignor to E. I. du Pont de Nemours and Company, Wilmington, Del., a corporation of Delaware
No Drawing. Filed Feb. 23, 1966, Ser. No. 529,242
10 Claims. (Cl. 23—358)

ABSTRACT OF THE DISCLOSURE

The invention is directed to preparation of salts of the general formula $M_a(B_9H_9)_b \cdot mH_2O$.

---

This invention relates to novel polyhedral boron compounds and their preparation. More specifically the invention is directed to salts of nonahydrononaborates. These salts can be represented by the formula $$M_a(B_9H_9)_b \cdot mH_2O$$

wherein M is a cation having a total atomic weight of at least 5 and a valence of 1–3; i.e., 1, 2 or 3 and is defined further below; $(B_9H_9)$ is a polyhedral borate anion of valence −2; $m$ is an integer of 0–10; and $a$ and $b$ are the smallest positive integers of 1–3 which satisfy the equation $$b = \frac{a \times \text{valence of } M}{2}$$

M can be composed of one or more than one element and is ionically bonded to the polyhedral boron anion. The groups represented by M bear a positive ionic charge and they have in common the property of forming positively charged groups or cations in water. The principal function of the group M is to provide an element or group of elements which bear the necessary positive charges to combine with the novel anion, and thus permit its isolation as part of a stable compound.

The properties of the group M are not critical and the group therefore represents a broad range of elements or combinations of elements. To illustrate, M can be certain metals, ammonium ($NH_4^+$), hydrocarbyl-substituted ammonium, hydrocarbyl-substituted phosphonium, hydrocarbyl-substituted sulfonium, hydrocarbyl-substituted arsonium, or metal-ammine. Because of availability, cations wherein the valence is one or two are preferred.

Metals that can serve as cations in the salts of this invention include the elements of Group I-A having atomic numbers of 3–55, inclusive; Group II-A having atomic numbers of 12–56, inclusive; I-B having atomic numbers of 29–47, inclusive; II-B having atomic numbers of 30–48, inclusive; the first series of transition elements having atomic numbers of 24–28, inclusive; and thallium. These groups are those shown in the Periodic Table in Lange's "Handbook of Chemistry," 9th edition, pages 56–57, Handbook Publishers, Inc. (1956). Specific metals operable as cations in the salts of this invention are lithium, sodium, potassium, rubidium, cesium, magnesium, calcium, strontium, barium, copper, silver, zinc, cadmium, chromium, manganese, iron, cobalt, nickel and thallium. Preferred metals are the alkali and alkaline earth metals, and most preferred are the alkali metals especially cesium, rubidium, potassium and sodium.

The hydrocarbyl-substituted ammonium, sulfonium, phosphonium or arsonium cations can be represented by the formulas $RNH_3^+$, $R_2NH_2^+$, $R_3NH^+$, $R_4N^+$, $RPH_3^+$, $R_2PH_2^+$, $R_3PH^+$, $R_4P^+$, $RAsH_3^+$, $R_2AsH_2^+$, $R_4As^+$ and $R_3S^+$. In these formulas R represents hydrocarbyl. The hydrocarbyl substitutents are not crtical features of these cations and thus can be open-chain, closed-chain, saturated, unsaturated or a heterocyclic ring of which the N, S, P or As atoms are the hetero component. Thus R can be alkyl, cycloalkyl, alkenyl, alkynyl, aryl, alkaryl, aralkyl, alkylene and the like. For the reason of availability, R preferably contains not more than 18 carbon atoms. For example, R can be methyl, 2-ethylhexyl, octadecyl, allyl, cyclohexyl, cyclohexenyl, phenyl, naphthyl, anthryl, cyclohexylphenyl, diphenylyl, benzyl, and the like. Preferably R is alkyl or aryl of up to 10 carbon atoms. Thus, the atomic weights of the hydrocarbyl-substituted cations can range from a low value of about 32 for $CH_3NH_3$ to a value as high as about 800 or even higher for long-chain substituted cations, e.g., the cation from trioctadecylamine.

The cation can also be a metal ammine such as those of the formula $(NH_3)_nY$ where $n$ is a positive whole number of at most 6 and Y is cobalt, nickel, zinc, cadmium, mercury or silver, as, for example $Zn(NH_3)_4^{+2}$, $Ni(NH_3)_6^{+2}$, $Co(NH_2C_2H_4NH_2)_3^{+2}$, and the like.

The cation can also be a combination of cations, as for example, two monovalent metals or a monovalent metal and a hydrocarbyl-substituted ammonium group. These are exemplified by $NaKB_9H_9$, $Cs(CH_3)_4NB_9H_9$, and the like.

Many of the metal salts of the $B_9H_9^{2-}$ anions are isolated from aqueous systems in the form of hydrated salts, i.e., the salts crystallize with water of hydration. Thus, the hydrated salts are those of the general formula $M_a(B_9H_9)_b \cdot mH_2O$, where $m$ is a positive number greater than 0 but not more than 10. In some cases, the water of hydration can be removed by heating the hydrated salt to elevated temperatures under reduced pressures, e.g., by heating at 150–200° C. under a pressure of less than 0.1 mm. of Hg for several hours.

Examples of novel compounds of the invention included by the general formula are as follows:

| | |
|---|---|
| $Li_2B_9H_9 \cdot 6–10H_2O$ | $[(C_2H_5)_4N]_2B_9H_9$ |
| $Na_2B_9H_9 \cdot 6–10H_2O$ | $[(C_8H_{17})NH_3]_2B_9H_9$ |
| $Cs_2B_9H_9$ | $[(C_{18}H_{37})_2NH_2]_2B_9H_9$ |
| $Rb_2B_9H_9$ | $[(C_4H_9)_3NH]_2B_9H_9$ |
| $MgB_9H_9 \cdot 6H_2O$ | $(pyridinium)_2B_9H_9$ |
| $SrB_9H_9 \cdot 2H_2O$ | $(quinolinium)_2B_9H_9$ |
| $BaB_9H_9 \cdot 2H_2O$ | $[(C_6H_{11})_2NH_2]_2B_9H_9$ |
| $Cu_2B_9H_9 \cdot 4H_2O$ | $[(C_6H_5CH_2)_2NH_2]_2B_9H_9$ |
| $Ag_2B_9H_9$ | $[(C_3H_5)_3NH]_2B_9H_9$ |
| $ZnB_9H_9 \cdot 6H_2O$ | $Zn(NH_3)_4B_9H_9$ |
| $Tl_2B_9H_9$ | $[(C_6H_5)_4P]_2B_9H_9$ |
| $FeB_9H_9 \cdot 6H_2O$ | $[(C_4H_9)_2PH_2]_2B_9H_9$ |
| $NiB_9H_9 \cdot 6H_2O$ | $[(C_8H_{17})_3PH]_2B_9H_9$ |
| $CoB_9H_9 \cdot 6H_2O$ | $[(C_{18}H_{37})PH_3]_2B_9H_9$ |
| $MnB_9H_9 \cdot 6H_2O$ | $[(C_4H_9)_3S]_2B_9H_9$ |
| $(NH_4)_2B_9H_9$ | |

The alkali metal salts of this invention are prepared by heating alkali metal triborohydrides, i.e., salts of the formula $M'B_3H_8$, where M' is Li, Na, K, Rb, or Cs, in the absence of a solvent and in the absence of oxygen at temperatures of 200–400° C., preferably at 220–250° C., and at pressures ranging from $10^{-4}$ mm. of Hg up to several atmospheres, e.g., up to 100 atmospheres. Preferably, the reaction is carried out at pressures of 10–600 mm. of Hg. The heating is continued under these conditions until the evolution of hydrogen ceases.

The cesium and rubidium $B_9H_9$ salts are relatively water insoluble and can be isolated by extracting the crude pyrolysates from $CsB_3H_8$ and $RbB_3H_8$, respectively, with hot water. The by-products are removed by this procedure, and the relatively insoluble $Cs_2B_9H_9$ or $Rb_2B_9H_9$ is left behind.

The sodium and potassium salts are water soluble and can be isolated by precipitation from an appropriate solvent system.

The rubidium and cesium triborohydride starting materials for this process can be prepared by the cation exchange reaction of water-soluble Rb or Cs salts, e.g., their fluorides, chlorides or sulfates, with sodium triborohydride or its dioxanate. Sodium and potassium triborohydride and their dioxanates can be prepared from sodium or potassium borohydride ($NaBH_4$ or $KBH_4$), respectively, and diborane by the method described by H. C. Miller, N. E. Miller and E. L. Muetterties in Inorg. Chem. 3, 1458 (1964). For example, a solution of 14 g. of rubidium sulfate in 40 ml. of water is added to a solution of 28 g. of $NaB_3H_8 \cdot 3C_4H_8O_2$ in 50 ml. of water. After chilling the solution in an ice bath, the precipitate that forms is filtered, washed with methanol and ether, and dried in vacuo. The crude solid, amounting to 6 g., is recrystallized from 25 ml. of water to give 3 g. of pure white needles of $RbB_3H_8$.

Other salts of the $B_9H_9^{2-}$ anion can be prepared from the alkali metal salts by methods involving simple metathetical reactions with other salts or hydroxides under neutral or alkaline conditions to effect an exchange of cations. The hydrocarbyl-substituted ammonium, phosphonium, sulfonium or arsonium cation containing compounds can be obtained by treating, e.g., $Na_2B_9H_9$ or $Cs_2B_9H_9$, with the corresponding hydroxide or halide whereupon the desired product precipitates. For example, an aqueous solution of $Na_2B_9H_9$ can be reacted with aqueous tetramethylammonium hydroxide with the formation of a precipitate of $[(CH_3)4N]_2B_9H_9$. Also, $Na_2B_9H_9$ can be reacted with an aqueous solution of triphenylmethylphosphonium bromide with the formation of a precipitate of $[(C_6H_5)_3CH_3P]_2B_9H_9$.

Another method for preparing some of the salts of $B_9H_9^{2-}$ from the cesium and rubidium salts involves passing an aqueous solution of $Cs_2B_9H_9$ or $Rb_2B_9H_9$ through a column packed with a basic ion-exchange resin, e.g., a sodium ion-exchange resin, and evaporating the effluent solution of $Na_2B_9H_9$ to dryness. In this method, the salt is usually isolated as its hydrate.

The metal ammine salts can be prepared by treating the sodium salt of $B_9H_9^{2-}$ with the halide, Y halide, in ammonium hydroxide whereupon the metal ammine salt of $B_9H_9$ precipitates.

Other metal cation salts of $B_9H_9^{2-}$ can be obtained by metathetical reaction with metal salts. A water soluble salt of $B_9H_9^{2-}$, such as the sodium salt, is reacted with another water soluble salt, e.g., TlF chosen such that the cation of the second salt will precipitate with the $B_9H_9^{2-}$ anion. Thus $Tl_2B_9H_9$ can be obtained. Similarly from $AgNO_3$, $Ag_2B_9H_9$ is obtained.

The products and processes of the invention are illustrated in further detail in the following examples.

Examples 1–3 illustrate the initial preparation of alkali metal $B_9H_9$ salts from $B_3H_8^-$ salts.

EXAMPLE 1

Solid cesium triborohydride (5.2 g., 0.03 mole) was gradually heated to a temperature of 250° C. in an evacuated glass vessel connected to a conventional vacuum train at a pressure of 3–5 microns of Hg. Heating was continued until the volume of gas evolved was constant (collected in a container of sufficient volume to maintain a pressure of 1–600 mm. of Hg.). About 2 hours were necessary to achieve constancy and a total of 1.07 liters (measured under standard conditions of temperature and pressure), corresponding to 0.048 mole, of hydrogen was collected. After the solid reaction product had been cooled to room temperature, it was extracted with 100 ml. of hot water. The extraction residue was recrystallized from 50 ml. of water to give tiny homogeneous crystals (0.8 g.) which were slightly yellowish in color.

*Analysis.*—Calcd. for $Cs_2B_9H_9$: Cs, 71.4%; B, 26.2%; H, 2.4%. Found: Cs, 71.6%; B, 26.7%; H, 2.9%.

Platinum-catalyzed acid hydrolysis gave 1112 ml. of $H_2$ per gram of $Cs_2B_9H_9$ which is in satisfactory agreement with the equation:

$$Cs_2B_9H_9 + 2HCl + 27H_2O \rightarrow 2CsCl + 9B(OH)_3 + 19H_2$$

The theory for this equation requires 1143 ml./g.

The compound $Cs_2B_9H_9$ has a characteristic infrared absorption spectrum by means of which it can be readily detected and identified in mixtures with other boron hydrides. The spectrum shows the following features: A B—H absorption region consisting of a very sharp spike at 2520 cm.$^{-1}$, and another intense band at 2410 cm.$^{-1}$ with a shoulder at 2470 cm.$^{-1}$; other bands occur at (estimated intensity in parentheses) 1045 (w), 986 (w), 881 (m), 804 (vw), 735 (w), and at 663 cm.$^{-1}$ (w). (m=medium; w=weak; vw=very weak.)

Ultraviolet spectrum:

$$\lambda_{max.}^{H_2O} = 2240 A. \quad (\epsilon = 3950)$$

The $B^{11}$ NMR spectrum measured at 19.25 Mc. consists of two doublets occurring at $\delta = +21.5$ p.p.m. ($J_{B-H} = 130 \pm 5$ cps.), and at $\delta = +39.6$ p.p.m.

$$(J_{B-H} = 123 \pm 2 \text{ cps.})$$

measured relative to trimethyl borate. The relative intensity ratios of the two doubles are 1:2.

Cesium nonahydrononaborate forms tetragonal crystals with the parameters $a = 6.50 A.$, $c = 12.06 A.$, $Z = 2$. The calculated density is $p = 2.43$; the experimentally determined density was $p = 2.43$.

In addition to the compound $Cs_2B_9H_9$, the isolation and properties of which are described above, the thermolysis of solid $CsB_3H_8$ also produces certain other products. These were isolated and characterized as follows:

The hot aqueous extract of the crude thermolysate of $CsB_3H_8$ was cooled to about 0° C. A solid (1.2 g.) precipitated, which was collected by filtration and identified as the double salt $Cs_2B_{12}H_{12} \cdot CsBH_4$ by comparison of its IR spectrum with that of an authentic sample. Treatment of this salt with hydrochloric acid converted this salt to another known double salt, namely, $Cs_2B_{12}H_{12} \cdot CsCl$.

*Analysis.*—Calcd. for $Cs_2B_{12}H_{12} \cdot CsCl$: Cs, 69.2%; B, 22.5%; H, 2.1%; Cl, 6.2%. Found: Cs, 67.5%; B, 22.5%; H, 2.6%; Cl. 6.2%.

The X-ray powder pattern, the IR spectrum and the $B^{11}$ NMR spectrum were identical with those of an authentic sample.

As the next step in the separation of the components of the reaction mixture, a concentrated aqueous solution of tetramethylammonium chloride was added to the filtrate of the cooled extract. Soft, velvet-like crystals (1.1 g.) were precipitated which were identified as $$(CH_3)_4NCsB_{10}H_{10}$$

by comparison of their infrared, $B^{11}$ NMR, and X-ray powder pattern with a known sample of that salt, as well as by analysis.

*Analysis.*—Calcd. for $(CH_3)_4NCsB_{10}H_{10}$: Cs, 40.9%; C, 14.8%; H, 6.8%; N, 4.3%; B, 33.3%. Found: Cs, 39.7%; C, 14.9%; H, 6.8%; N, 4.2%; B, 33.1%.

EXAMPLE 2

In the apparatus described in Example 1, 1.5 g. of solid rubidium triborohydride was heated to 250° C. for 2 hours at the pressure of that example. At the end of this time, evolution of hydrogen had ceased and a total of 432 ml. of hydrogen was collected.

The components of the solid reaction mixture were separated from each other by fractional crystallization in the following way. The crude mixture was dissolved in 10 ml. of hot water, and the temperature of the solution was adjusted to 40–50° C. Rubidium nonahydrononaborate, $Rb_2B_9H_9$, precipitated under these conditions as the least soluble compound of the mixture. Yield: 0.3 g.

*Analysis.*—Calcd. for $Rb_2B_9H_9$: B, 35.1%; H, 3.3%. Found: B, 35.2%; H, 3.4%.

Platinum-catalyzed acid hydrolysis of $Rb_2B_9H_9$ gave 1520 ml. of hydrogen per gram which is consistent with the equation:

$$Rb_2B_9H_9 + 2HCl + 27H_2O \rightarrow 2RbCl + 9B(OH)_3 + 19H_2$$

Theory for this equation is 1534 ml./g.
Ultraviolet spectrum:

$$\lambda_{max}^{H_2O} = 2260 \text{A}. \ (\epsilon = 4040).$$

The infrared and $B^{11}$ NMR spectra of $Rb_2B_9H_9$ are indistinguishable from those of $Cs_2B_9H_9$.

The filtrate from the isolation of $Rb_2B_9H_9$ was cooled to about room temperature to give another precipitate which was collected. This fraction amounted to 0.3 g. Its IR spectrum indicated that it consisted of essentially $Rb_2B_{12}H_{12} \cdot RbBH_4$ contaminated by a small amount of additional $Rb_2B_9H_9$.

The remaining mother liquor was treated with an aqueous solution of tetramethylammonium hydroxide to afford 0.4 g. of precipitate. The infrared spectrum of this fraction showed the presence of $B_{10}H_{10}^{2-}$ and a much smaller amount of $B_{12}H_{12}^{2-}$.

*Analysis.*—Calcd. for $(CH_3)_4NRbB_{10}H_{10}$: C, 17.3%; H, 8.0%; N, 5.0%; B, 38.9%. Found: C, 19.6%; H, 8.4%; N, 5.7%; B, 39.7%.

EXAMPLE 3

In the apparatus described in Example 1, 16.5 g. of solid potassium triborohydride was heated to 227° C. during a period of 90 minutes. A total of 6.3 liters of hydrogen was evolved during this time. The solid pyrolysate was cooled to room temperature. This solid, which contained potassium nonahydrononaborate, was dissolved in 50 ml. of hot water, and treated with a solution of 30 g. of cesium fluoride in 20 ml. of water. The resulting precipitate was collected by filtration, and subsequently extracted with 150 ml. of boiling water. The infrared spectrum of the extraction residue showed the characteristic features of cesium nonahydrononaborate proving that potassium nonahydrononaborate was a constituent of the original pyrolysate. The yield was 3 g. A sample of the product was recrystallized from water for analysis.

*Analysis.*—Calcd. for $Cs_2B_9H_9$: B, 26.2%; hydrolytic $H_2$, 1143 ml./g. Found: B, 26.5%; hydrolytic $H_2$, 1126 ml./g.

The extracted solution from the crude precipitate was cooled to 0° C. A precipitate weighing 5.5 g. was obtained in this way which was shown by infrared spectroscopy to consist of a mixture of the known double salt $Cs_2B_{12}H_{12} \cdot CsBH_4$ and of an additional amount of cesium nonahydrononaborate. By fractional crystallization from 200 ml. of water, 0.5 g. of the latter compound was isolated from the mixture. After the separation of the cesium nonahydrononaborate, an excess of concentrated hydrochloric acid was added to the solution. Chilling gave 1.5 g. of a precipitate, the IR spectrum of which was identical with that of an authentic sample of the known double salt $Cs_2B_{12}H_{12} \cdot CsCl$.

A third product, cesium tetramethylammonium decahydrodecaborate, $(CH_3)_4NCsB_{10}H_{10}$, was isolated from the original crude mixture in the following way: The filtrate obtained by collecting the precipitate resulting from the reaction of the crude pyrolysate with an aqueous solution of cesium fluoride, was treated with a concentrated aqueous solution of tetramethylammonium chloride. The precipitate was collected by filtration and recrystallized from water. The yield was 0.1 g. The IR spectrum of the product was identical with that of an authentic sample of cesium tetramethylammonium decahydrodecaborate.

Example 4 illustrates cation metathesis by metal ion exchange resins.

EXAMPLE 4

A solution of 0.5 g. of $Cs_2B_9H_9$ in 150 ml. of water basified by a few drops of 2 N sodium hydroxide solution was passed through a column packed with the sodium ion-exchange resin which was prepared by saturating the cation exchange resin known commercially as Rexyn 101(H) with an aqueous solution of sodium chloride and washing with water until the run-off was neutral and free of chloride ion. The eluate was evaporated to dryness to give 0.3 g. of hydrated disodium nonahydrononaborate.

Examples 5–8 illustrate the preparation of the metal ammine salts.

EXAMPLE 5

An aqueous solution of sodium nonahydrononaborate was prepared in the same way as described in Example 4. A solution of nickel(II) chloride in ammonium hydroxide solution was added to this solution of $Na_2B_9H_9$, and the mixture was chilled in an ice-bath. Small bluish-violet crystals were precipitated which were collected by filtration, washed with ether and air-dried. The infrared spectrum of the product showed the features of the spectrum of nickel hexammine dichloride (see, for example, K. Nakamoto, Infrared Spectra of Inorganic and Coordination Compounds, John Wiley & Sons, Inc. 1963, p. 144, for a spectrum of $Ni(NH_3)_6Cl_2$) and the bands characteristic of the $B_9H_9^{2-}$ ion which are listed in Example 1. Hence it is reasonable to conclude that the product was nickel hexammine nonahydrononaborate, $$Ni(NH_3)_6B_9H_9$$

EXAMPLE 6

A solution of $Na_2B_9H_9$ in water was prepared from 1.9 g. of $Cs_2B_9H_9$ by a sodium ion-exchange process as described in Example 4. To a portion of this solution another solution of cobalt (II) chloride in aqueous ammonium hydroxide was added. The resulting light-brown precipitate was identified by infrared analysis as $Co(NH_3)_6B_9H_9$.

EXAMPLE 7

To the major part of the aqueous solution of $Na_2B_9H_9$ of Example 6, an excess of $Zn(NH_3)_2Cl_2$ in ammonium hydroxide was added. The precipitate was collected and recrystallized from 20 ml. of dilute ammonium hydroxide to give 0.1 g of small, prismatic crystals of zinc tetrammine monohydrononaborate.

*Analysis.*—Calcd. for $Zn(NH_3)_4B_9H_9$; N, 23.4%; H, 8.8%. Found: N, 22.8%; H, 9.0%.

EXAMPLE 8

The remainder of the aqueous solution of $Na_2B_9H_9$ of Example 6 was treated with an ammoniacal solution of cadmium chloride. The yellowish precipitate was collected by filtration and recrystallized from 100 ml. of dilute ammonium hydroxide to give, in two crops, a total of 0.5 g. of cadmium tetrammine nonahydrononaborate.

*Ananlysis.*—Calcd. for $Cd(NH_3)_4B_9H_9$: B, 33.9%; N, 19.5%; H, 7.4%. Found: B, 33.1%; N, 20.7%; H, 7.6%.

Platinum catalyzed acidic hydrolysis gave 1431 ml. of $H_2$ per gram of compound which is in satisfactory agreement with the calculated amount of 1483 ml./g.

Example 9 illustrates replacement of one metal cation by another.

EXAMPLE 9

Hydrated $Na_2B_9H_9$ (0.3 g.), prepared by an ion-exchange procedure as described in Example 4, was dissolved in 20 ml. of water. A small portion of the solution was withdrawn and added to a saturated solution of thallium acetate in water. The slightly yellow precipitate was filtered, washed with methanol and ether, and air-dried. Its infrared spectrum showed the same characteristic features as those in the spectra of $Cs_2B_9H_9$ and $Rb_2B_9H_9$, respectively, proving that the compound was thallium monohydrononaborate, $Tl_2B_9H_9$.

Example 10 illustrates the preparation of the hydrocarbyl-substituted onium salts.

EXAMPLE 10

The hydrated disodium monahydrononaborate of Example 4 was redissolved in 20 ml. of water and a saturated aqueous solution of trimethylsulfonium iodide was added. The resulting precipitate was recrystallized from a small volume of water to give 0.3 g. of slightly yellowish, needle-like crystals of bis(trimethylsulfonium) monahydrononaborate.

*Analysis.*—Calcd. for $[(CH_3)_3S]_2B_9H_9$: B, 37.3%; S, 24.6%. Found: B, 37.4%; S, 24.6%.

Ultraviolet spectrum:

$$\lambda_{max.}^{H_2O} = 2260A. \quad (\epsilon = 4540)$$

The $B^{11}$ NMR spectrum was identical with those of $Rb_2B_9H_9$ and $Cs_2B_9H_9$.

By using the reactants listed below with $Na_2B_9H_9$ or $Cs_2B_9H_9$ and the procedure of the example listed below, the products, also listed, can be obtained.

| Example | Reactant | Product |
|---|---|---|
| 10 | $(C_6H_5)_3CH_3PCl$ | $[(C_6H_5)_3CH_3P]_2B_9H_9$ |
| 10 | $(C_2H_5)_3NHCl$ | $[(C_2H_5)_3NH]_2B_9H_9$ |
| 10 | $(C_6H_5)_4AsCl$ | $[(C_6H_5)_4As]_2B_9H_9$ |
| 10 | $(CH_3)_4NOH$ | $[(CH_3)_4N]_2B_9H_9$ |
| 10 | $(C_2H_5)PH_3Br$ | $(C_2H_5PH_3)_2B_9H_9$ |
| 10 | $(C_4H_9)(C_2H_5)_2PHCl$ | $[(C_4H_9)(C_2H_5)_2PH]_2B_9H_9$ |
| 10 | $(C_6H_5)(CH_3)_2SBr$ | $[(C_6H_5)(CH_3)_2S]_2B_9H_9$ |
| 4 | $NH_4^+$ ion-exchange resin | $(NH_4)_2B_9H_9$ |
| 10 | $(C_6H_5)_2NH_2Cl$ | $[(C_6H_5)_2NH_2]_2B_9H_9$ |
| 10 | $CH_3NH_3Br$ | $[CH_3NH_3]_2B_9H_9$ |
| 10 | $(C_2H_5)_2AsH_2Cl$ | $[(C_2H_5)_2AsH_2]_2B_9H_9$ |
| 5 | $HgCl_2+NH_4OH$ | $[Hg(NH_3)_2]B_9H_9$ |
| 5 | $AgCl+NH_4OH$ | $[Ag(NH_3)_2]_2B_9H_9$ |
| 4 | $Mg^{2+}$ ion-exchange resin | $MgB_9H_9$ |
| 4 | $Ba^{2+}$ ion-exchange resin | $BaB_9H_9$ |
| 4 | $Cu^{2+}$ ion-exchange resin | $Cu_2B_9H_9$ |
| 4 | $Zn^{2+}$ ion-exchange resin | $ZnB_9H_9$ |
| 4 | $Mn^{2+}$ ion-exchange resin | $MnB_9H_9$ |
| 9 | $Ni^{2+}$ ion-exchange resin | $NiB_9H_9$ |

The products of this invention are in general crystalline solids that are salt-like in character. Many of the compounds are soluble in water and in organic solvents such as alcohols and tetrahydrofuran.

In acidified aqueous or alcoholic solutions, the salts of the nonahydrononaborate anion are strongly reducing, hydrogen being liberated from them. In neutral or alkaline solution, however, the nonahydrononaborate anion is stable towards hydrolytic degradation. More specifically aqueous solutions of $Cs_2B_9H_9$ at a pH of 1 have a life time of only a few minutes, at a pH of 6.5 a life time of about an hour, while at a pH of 10 they have a life time of many weeks.

The compounds of this invention are useful as reducing agents. They are especially useful as reducing agents in the preparation of printed electrical circuits. For exemple, on a clean paper surface a circuit is traced using an aqueous solution of cesium nonahydrononaborate. After evaporation of the solvent, the tracings are sprayed with a solution of palladium chloride in acetonitrile. A black metallic tracing of palladium appears along the circuit lines.

These nonahydrononaborate salts are also useful as solid hydrogen carriers since they generate hydrogen readily when placed in an acidified aqueous medium. For example, 1 g. of $Na_2B_9H_9$ gives 2.8 liters of hydrogen, whereas 1 g. of calcium hydride, which is commonly used for that purpose, gives only 1.1 liters of hydrogen.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A boron compound of the formula $$M_a(B_9H_9)_b \cdot mH_2O$$

wherein M is a cation selected from the group consisting of
 (a) metals selected from Group I–A having atomic numbers of 3–55 inclusive, Group II–A having atomic numbers of 12–56 inclusive, Group I–B having atomic numbers of 29–47 inclusive, Group I–B having atomic numbers of 30–48 inclusive, the first series of transition elements having atomic numbers of 24–28 inclusive, and thallium;
 (b) hydrocarbyl-substituted ammonium, sulfonium, phosphonium or arsonium groups having not more than 18 carbon atoms in each hydrocarbyl substituent;
 (c) metal ammines of the formula $(NM_3)_nY$ where $n$ is a positive whole number of at most 6 and Y is cobalt, nickel, zinc, cadmium, mercury of silver;
 (d) ammonium; and combinations of the above cations.
$m$ is an integer of 0–10 inclusive; and $a$ and $b$ are the smallest positive integers of 1–3 inclusive which satisfy the equation $$b = \frac{a \times \text{valence of } M}{2}$$

2. Compounds of claim 1 wherein M is a metal defined as in claim 1.

3. Compounds of claim 1 wherein M is hydrocarbyl-substituted ammonium, sulfonium, phosphonium or arsonium as defined in claim 1.

4. Compounds of claim 1 wherein M is a metal ammine as defined in claim 1.

5. Compounds of claim 1 wherein M is an alkali metal.

6. Compounds of claim 1 wherein M is alkyl-substituted ammonium in which each alkyl group contains up to 10 carbon atoms.

7. A compound of claim 1 which has the formula $Cs_2B_9H_9$.

8. A compound of claim 1 which has the formula $Na_2B_9H_9 \cdot mH_2O$ wherein $m$ is an integer of 0–10 inclusive.

9. A compound of claim 1 which has the formula $[(CH_3)_3S]_2B_9H_9$.

10. Process for preparing compounds of the formula $M'_2B_9H_9$ wherein $M'$ is an alkali metal which comprises heating a compound of the formula $M'B_3H_8$ wherein $M'$ is defined as above at a temperatuere of between 200–400° C. in the absence of a solvent and oxygen and at a pressure of from $10^{-4}$ mm. up to 100 atmospheres.

No references cited.

OSCAR R. VERTIZ, *Primary Examiner.*

G. PETERS, *Assistant Examiner.*

UNITED STATES PATENT OFFICE
CERTIFICATE OF CORRECTION

Patent No. 3,411,891                                                    November 19, 1968

Frank K. Klanberg

It is certified that error appears in the above identified patent and that said Letters Patent are hereby corrected as shown below:

Column 6, lines 47 and 75 and column 7, lines 5 and 11, "monahydrononaborate" should read -- monahydrononaborate --. Column 7, in the table, second column, line 14 thereof, "Mg2+ion-exhcnage" should read -- $Mg^{2+}$ion-exchange --; same column 7, same table, the last five entries should show the charge "2+" as a superscript on all of the entries. Column 8, line 20, "I-B" should read -- II-B --; line 25, "$(NM_3)_n Y$" should read -- $(NH_3)_n Y$ --.

Signed and sealed this 31st day of March 1970.

(SEAL)
Attest:

Edward M. Fletcher, Jr.                                  WILLIAM E. SCHUYLER, JR.
Attesting Officer                                             Commissioner of Patents